(12) United States Patent
Furseth et al.

(10) Patent No.: US 8,443,938 B2
(45) Date of Patent: May 21, 2013

(54) HUNTING LADDER STAND HAVING COLLAPSIBLE LADDER SEGMENTS

(75) Inventors: Michael R. Furseth, Cumberland, WI (US); Randy L. Schamberger, Cumberland, WI (US); Scott R. Nickell, Cumberland, WI (US)

(73) Assignee: Ardisam, Inc., Cumberland, WI (US)

( * ) Notice: Subject to any disclaimer, the term of this patent is extended or adjusted under 35 U.S.C. 154(b) by 223 days.

(21) Appl. No.: 12/939,843

(22) Filed: Nov. 4, 2010

(65) Prior Publication Data
US 2012/0111666 A1 May 10, 2012

(51) Int. Cl.
*E06C 1/58* (2006.01)
(52) U.S. Cl.
USPC ............. 182/159; 182/116; 182/178.3
(58) Field of Classification Search
USPC ............ 182/116, 159, 160, 178.3, 178.5
See application file for complete search history.

(56) References Cited

U.S. PATENT DOCUMENTS

| | | | |
|---|---|---|---|
| 716,057 A | 12/1902 | Labranche et al. | |
| 3,024,864 A | 1/1962 | Padlo | |
| 3,391,757 A * | 7/1968 | Duke et al. | 182/17 |
| 3,414,081 A | 12/1968 | Wedvik | |
| 3,575,263 A | 4/1971 | Reinhard | |
| 3,989,122 A * | 11/1976 | Jenkins | 182/84 |
| 4,189,028 A | 2/1980 | Reinhard | |
| 4,245,717 A | 1/1981 | Soucy | |
| 4,430,839 A * | 2/1984 | Butters | 52/696 |
| 4,463,829 A | 8/1984 | Grin | |
| 4,742,888 A | 5/1988 | Amacker | |
| 4,785,912 A | 11/1988 | Lopez | |
| 4,815,564 A * | 3/1989 | Yoo | 182/160 |
| 4,907,675 A * | 3/1990 | Saby et al. | 182/178.5 |
| 5,060,756 A | 10/1991 | D'Acquisto | |
| 5,339,920 A | 8/1994 | Eriksson | |
| 5,788,011 A | 8/1998 | Kemmer et al. | |
| 6,145,621 A | 11/2000 | Nye | |
| 6,334,508 B1 | 1/2002 | Shields | |
| 6,457,559 B1 | 10/2002 | Schlueter | |
| 6,536,558 B2 | 3/2003 | Price | |
| 6,622,823 B2 | 9/2003 | Engstrom | |
| 6,715,584 B2 | 4/2004 | Ostyn | |
| 7,717,232 B2 * | 5/2010 | Butcher | 182/178.3 |
| 2008/0128204 A1 | 6/2008 | Engstrom | |
| 2012/0080267 A1 | 4/2012 | Furseth et al. | |
| 2012/0080269 A1 | 4/2012 | Furseth et al. | |
| 2012/0168249 A1 | 7/2012 | Furseth et al. | |

OTHER PUBLICATIONS

Duo Safety Ladder Corporation, Fire Ladders Aluminum and Fiberglass, p. 12, Catalog No. 106.

* cited by examiner

*Primary Examiner* — James O Hansen
*Assistant Examiner* — Kristine Florio
(74) *Attorney, Agent, or Firm* — Stoel Rives LLP

(57) ABSTRACT

An elevated hunting stand with a platform assembly and a collapsible ladder. The collapsible ladder includes a plurality of telescopically separating sections. The ladder sections are secured together by locking pins. The ladder rails and rungs are pivotally attached and operated as a parallelogram linkage system, so the ladder sections can be reduced in size to a compressed configuration by rotating the rungs relative to the rails. A plurality of stabilizing members are provided to hold the ladder sections in an expanded position. The platform assembly can serve as one of the stabilizing members.

17 Claims, 4 Drawing Sheets

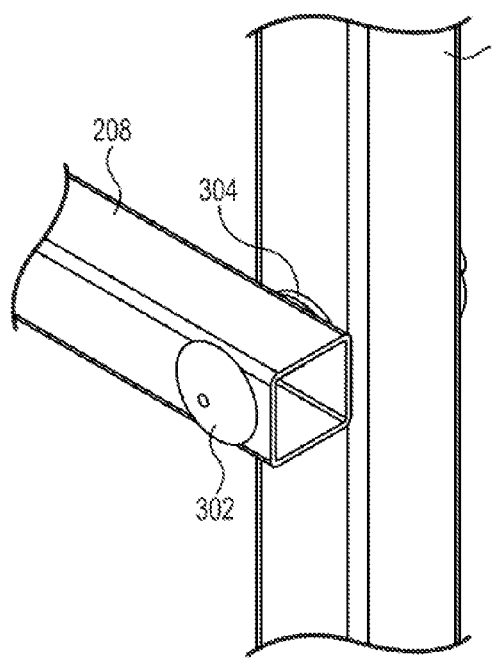
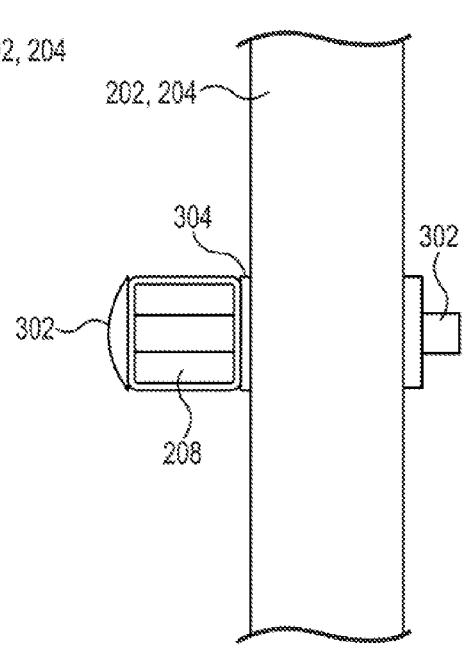
Fig. 3
Fig. 4

HUNTING LADDER STAND HAVING COLLAPSIBLE LADDER SEGMENTS

BACKGROUND OF THE INVENTION

Hunting stands are well known for the allowing hunters to hunt comfortably from an elevated position for an extended period of time. There are three basic types of hunting stands: hang-on stands, climbing stands, and ladder stands. All three types of stands have the two basic components: a platform portion for supporting the hunter in a standing position and a seat portion for supporting the hunter in a seated position. Key differences between the types of stands are the based on how a user installs the stand in an elevated position, how a user enters the stand once it is installed, and the portability of the stand.

Conventional hang-on stands are installed in an elevated position on a tree by using a separate conventional climbing device and are installed by being strapped to a tree and having the platform engage the tree. A user enters a hang-on stand by using a conventional ladder or a separate tree climbing aid, such as "climbing sticks." A stand alone conventional hang-on stand offers significant portability as it does not include a ladder or climbing equipment. However, hang-on stands do require a ladder or climbing aid for use. U.S. Pat. No. 5,060,756 discloses a conventional hang-on stand.

Conventional climbing stands are configured to allow a user to climb a tree using climbing straps attached to the platform and seat portions. When using a conventional climbing stand a user uses the climbing straps to climb to a desired elevated position on a tree. Once the user reaches the desired elevated position, the user installs the stand by securing straps around the tree. Climbing stands also offer significant portability as they do not require a ladder or separate climbing aid for installation or use. U.S. Pat. No. 6,622,823 discloses a conventional climbing stand.

Conventional ladder stands include a ladder section which is used to support the platform and seat. Ladder stands are installed by attaching the platform and seat to the ladder section and simply leaning the ladder section against the tree and securing the ladder stand. Once a ladder stand is installed a user can freely enter or exit the stand by climbing the ladder section. Aside from ease which ladder stands can be entered or exited, ladder stands offer several other significant advantages over hang-on and climbing stands, such as the ability to support larger platforms and seats which can allow for multiple hunters to be able to use the stand simultaneously. U.S. Pat. No. 4,742,888 disclosed a conventional ladder stand.

Because conventional ladder stands include a ladder section, they typically lack the portability of hang-on and climbing stands. Prior art ladder stands, such as the ladder stands disclosed in U.S. Pat. Nos. 4,742,888 and 6,334,508 have attempted to increase portability by offering having a ladder section composed of a number of fixed ladder segments. Ladder segments of conventional ladder stands are typically constructed by welding rungs composed of steel tubing to rails composed of steel tubing. Ladder segments in prior art ladder stands are typically connected to one another by pins which traverse the respective connecting rails. Although having a ladder section composed of a number of fixed ladder segments increases the portability versus a ladder section composed of one large segment, the portability is limited by the width of each of the fixed ladder sections. Further, in conventional fixed ladder segments the connection points or joints between the rails of two ladders segments are in-line. Having ladder joints in-line does not provide for maximum stability. Further, conventional fixed ladder segment designs do not provide a method of easily adjusting the height of a platform.

U.S. Pat. Nos. 4,463,829 and 5,339,920 disclose prior art stand-alone fixed length ladders where the distance between the rails can be varied where the ladders rungs are located within channels of ladder rails. The stand-alone ladders disclosed U.S. Pat. Nos. 4,463,829 and 5,339,920 as well as other prior art stand-alone ladders do not provide predictable results for the design of a hunting stand ladder section, as stand-alone ladders are not designed to support the weight of a hunter or a platform. In particular, foldable ladders with rungs places within channels of the respective rails, as disclosed U.S. Pat. Nos. 4,463,829 and 5,339,920, do not account for potential ladder twist which may occur. Further, stand-alone ladders are not designed to operate as a ladder segment that must engage another ladder segment.

BRIEF SUMMARY OF THE INVENTION

The present disclosure is directed to an elevated hunting stand with a platform assembly and a collapsible ladder. The collapsible ladder includes a plurality of telescopically separating sections. The ladder sections are secured together by locking pins. The ladder rails and rungs are pivotally attached and operated as a parallelogram linkage system, so the ladder sections can be reduced in size to a compressed configuration by rotating the rungs relative to the rails. A plurality of stabilizing members are provided to hold the ladder sections in an expanded position during use.

The ladder rails are optionally staggered so that joints of adjacent ladder segments are staggered to increase stability. The present segmented ladder and various stabilizing members permit the ladder height to be easily adjusted.

In one embodiment, the collapsible includes a plurality of telescopically engaging ladder segments each have a first ladder rail, a second ladder rail, and a plurality of rung member pivotally attached to each of the first and second ladder rails in a parallelogram linkage. The separation between the first and second ladder rails is adjustable between a collapsed position to an expanded position. At least one stabilizing member is attached to the ladder segments to maintain the first and second ladder rails in the expanded position during use.

In one embodiment, the stabilizing member includes a least one rung member rigidly attached to a pair of rail sections. The rail sections telescopically engage with the first and second rails of the ladder section. A plurality of spring lock pins are used to retain the stabilizing member in telescopic engagement with the first and second ladder rails. One of the ladder segments preferably telescopically engages with the elevated hunting platform so the elevated hunting platform maintains the first and second ladder rails in the expanded position.

The first and second ladder rails can be the same or different lengths. In some embodiments, adjacent ends of the first and second rails are staggered when in the expanded position. The rung members are preferably attached to exterior surfaces of the first and second ladder rails.

In one embodiment, the first and second ladder rails are approximately the same length, but the rung members are pivotally attached to the first and second ladder rails at different respective points along the lengths thereof so adjacent ends of the first and second rails are staggered. In this embodiment, the rail sections on the stabilizing member are preferably different lengths. In one embodiment, the rail segments are releasably attachable to a rail section of the stabilizing member.

The present disclosure is also directed to an elevated hunting stand having a platform assembly and a ladder assembly having a first ladder rail, a second ladder rail, and a plurality of rung member pivotally attached to each of the first and second ladder rails in a parallelogram linkage. The separation between the first and second ladder rails is adjustable between a collapsed position to an expanded position. The platform assembly attaches to adjacent ends of the ladder assembly to maintain the first and second ladder rails in the expanded position.

The present disclosure is also directed to a method of assembling an elevated hunting stand. A first ladder assembly is converted from a collapsed position to an expanded position by separating first and second ladder rails connected by a plurality of pivotally attached rung members in a parallelogram linkage. Adjacent ends of the first and second rails are then attached to the platform assembly to maintain the first and second ladder rails in the expanded position.

The method may also include converting a second ladder assembly from a collapsed position to an expanded position, and telescopically engaging the second ladder assembly to the first ladder assembly. A stabilizing member is optionally attached to the second ladder assembly for additional stability.

Additional advantages and novel features of the disclosure are set forth in part in the description which follows, and in part will become apparent to those skilled in the art upon examination of the following or may be learned by practice of the disclosure. The advantages of the disclosure may be realized and attained by means of the instrumentalities and combinations particularly pointed out in the appended claims.

BRIEF DESCRIPTION OF THE SEVERAL VIEWS OF THE DRAWING

The accompanying drawings, which are incorporated in and form a part of the specification, illustrate an exemplary embodiment of the present disclosure and, together with the description, serve to explain the principles of the disclosure. In the drawings:

FIG. 3 illustrates an enlarged perspective view of an exemplary pivotally attached rail and rung in accordance with an embodiment of the present disclosure.

FIG. 4 is a cross sectional perspective view of the pivotally attached rail and rung of FIG. 3.

DETAILED DESCRIPTION OF THE INVENTION

Figure 1:
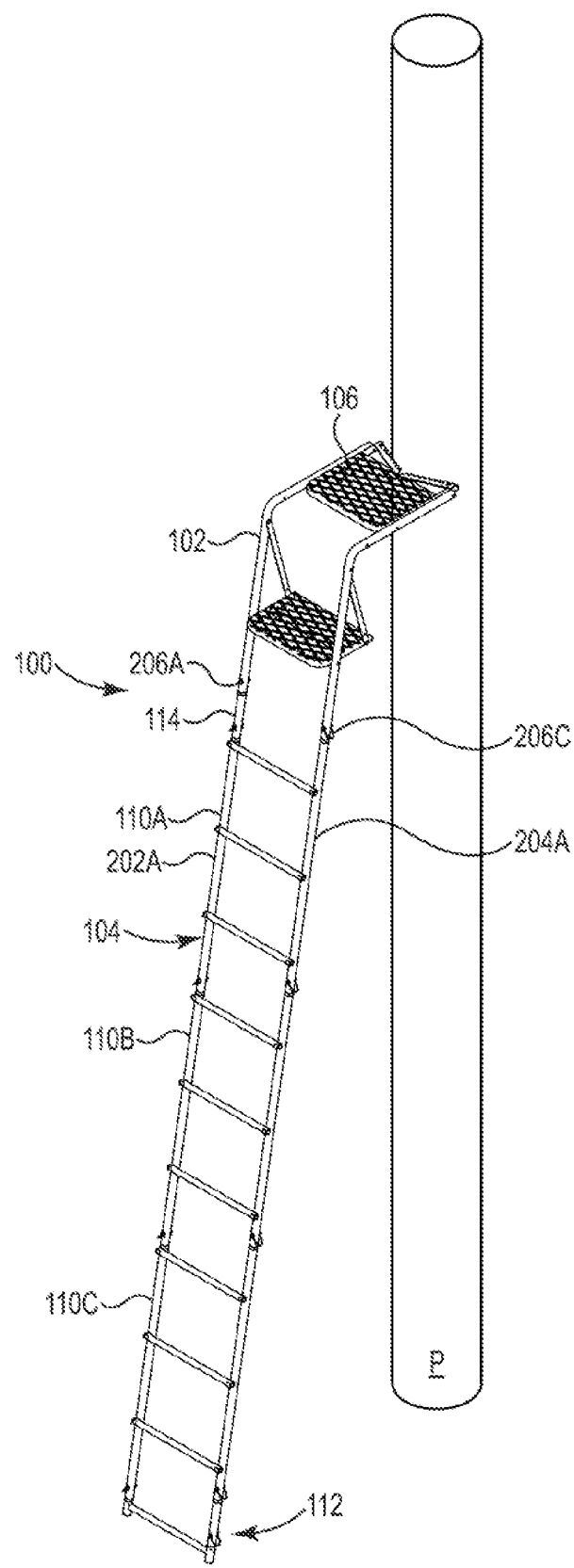
FIG. 1 is a perspective view of an exemplary hunting stand with a collapsible ladder assembly in accordance with an embodiment of the present disclosure.

FIG. 1 illustrates an exemplary hunting stand 100 installed on a support post P wherein hunting stand 100 includes a platform assembly 102, and a collapsible ladder assembly 104. Hunting stand 100 can be constructed of any suitable materials capable of bearing weight and withstanding the weather elements, such as for example, powder-coated all-weather steel, aluminum, fiber reinforced thermoset resins, natural or engineered wood products, carbon fiber, composite materials, and/or combinations thereof. Hunting stand 100 can optionally be camouflaged and/or covered by a blind to conceal a hunter's presence. Hunting stand 100 materials can be camouflaged using a powder coating technique, water emersion printing, thin film coating, color fusion, or another suitable technique.

Platform assembly 102 includes a seat portion 106 and a platform portion 108. Seat portion 106 is generally rectangular in shape and adapted to allow a hunter to sit comfortable for an extended period of time. Seat portion 106 can be sized to support one or more hunters. Seat portion 106 can be constructed of a rigid material, such as a steel or aluminum mesh, and include a support cushion constructed of a suitable foam material to provide comfort and insulation. Seat portion 106 can also be constructed of a weight bearing fabric, such a canvas or a synthetic weaved mesh fabric, spanning the platform assembly 102.

Seat portion 106 optionally includes a back support, arm rests, and a shooting rail, such as disclosed in U.S. Patent Publication No. 2008/0128204 (Engstrom), which is hereby incorporated by reference. Platform portion 108 is preferably constructed of a rigid material adapted to support the weight of one or more hunters, such as steel or aluminum mesh welded on top of steel or aluminum tubing. Platform portion 108 can also be constructed out of cast metals or alloys, such as cast aluminum. Platform portion 108 provides a shooting platform for a hunter in a standing position and a foot rest for a hunter in a seated position.

Figure 2:
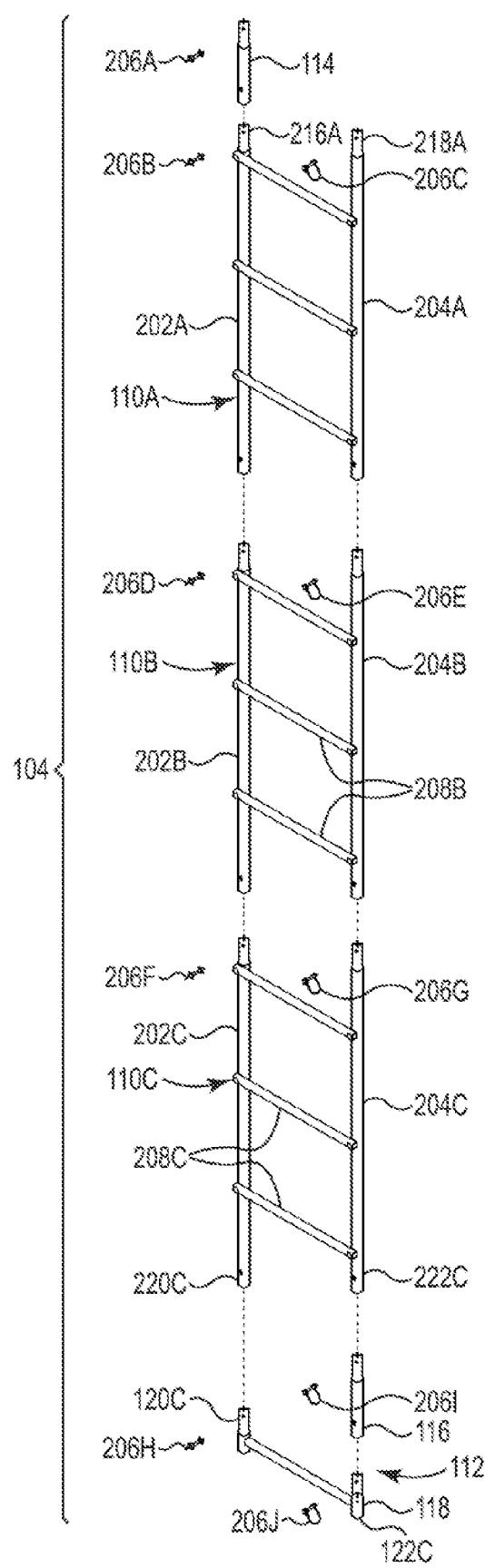
FIG. 2 is an exploded view of the collapsible ladder assembly shown in FIG. 1.

FIG. 2 is an exploded view of the collapsible ladder assembly 104 including ladder sections 110A, 110B and 110C (collectively "110"), ladder stabilizing assembly 112, and rail extension 114. The ladder assembly 104 is preferably constructed out of rigid material, such as steel or aluminum tubing.

Each ladder section includes a pair of rails 202A, 202B, 202C ("202") and 204A, 204B, 204C ("204") and a plurality of pivotally attached rungs 208A, 208B, 208C ("208"). The rung 208 can be constructed from any of the materials disclosed herein, but are preferably constructed out of steel or aluminum tubing. More or less than three ladder sections 110 can be used with the present hunting stand 100. In the exemplary embodiment, rail 202, 204 are approximately the same length, as are the rungs 208. Alternatively, the rails 202, 204 and the rungs 208 could be different lengths.

As illustrated in FIGS. 3 and 4, the rungs 208 are pivotally attached to rail 202, 204 by rivet 302. Alternatively, rungs 208 can be fastened to rails 202, 204 using a nut and bolt combination. Nylon washers 304 allow for smooth and quiet pivotal movement of the rungs 208 relative to the rails 202, 204. Rungs 208 are preferably separated from the rails 202, 204 by nylon washers 304.

Figure 5A:
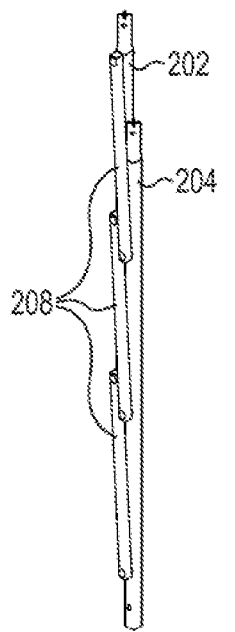
FIG. 5A illustrates an exemplary collapsible ladder section in a collapsed position in accordance with an embodiment of the present disclosure.
Figure 5B:
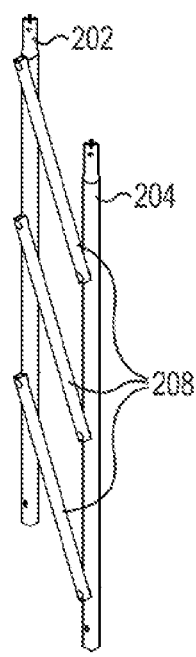
FIG. 5B illustrates an exemplary collapsible ladder section in a partially expanded position in accordance with an embodiment of the present disclosure.

The pivotal attachment of the rungs 208 to the rails 202, 204 allows ladder sections 110 to operate similar to a parallelogram linkage system, as illustrated in FIGS. 5A and 5B. In particular, the rails 202, 204 move toward each other as the rungs 208 rotate relative to the rails 202, 204. FIG. 5B illustrates a partially collapsed position, while FIG. 5A illustrates the fully collapsed position. In the collapsed position, as shown in FIG. 5A, the rail 202, 204 are a minimal distance apart. In the collapsed position the ladder sections 110 are more easily carried and transported.

Turning back to FIGS. 1 and 2, the ladder section 110A includes rails 202A, 204A, spring lock pins 206A, 206B, 206C, and one or more rungs 208A. The ladder section 110A is moved to the expanded position, with the rungs 208A generally perpendicular to the rails 202A, 204A.

Adjacent ends 216A, 218A of the rails 202A, 204A are staggered. The rail 202A telescopically engages with rail extension 114 to compensate for the staggered rails 202A, 204A. Spring lock pin 206B secures the rail extension 114 to the rail 202A. The rail extension 114 is telescopically engaged with the platform assembly 102, which are secured together by spring lock pin 206A. The rail 204A telescopically engages with the platform assembly 102, which are secured together by spring lock pin 206C. The platform assembly 102 serves to retain the ladder sections 110 in the expanded position.

Rails 202B, 204B of ladder section 110B telescopically engage with corresponding rails 202A, 204A, respectively. Spring locking pins 206D, 206E secure the ladder section 110A to the ladder section 110B. Similarly, rails 202C, 204C of ladder section 110C telescopically engage with corresponding rails 202B, 204B, respectively. Spring locking pins 206F, 206G secure the ladder section 110B to the ladder section 110C.

Adjacent ends 220C, 222C of the ladder rails 202C, 204C, respectively are staggered or vertically offset. Extension piece 116 is telescopically engaged with the rail 204C in order to compensate for that vertical offset. In order to help retain the ladder sections 110 in the expanded position, ladder stabilizing assembly 112 telescopically engages with the ladder section 110C. Rigid ground extension piece 118 includes rigidly attached rail sections 120C, 122C that telescopically engage with the ladder rail 202C and the extension piece 116. Spring locking pins 206H, 206I, and 206J retain the ladder stabilizing assembly 112 to the ladder section 11C.

Figure 6:
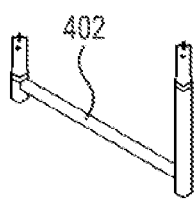
FIG. 6 illustrates an exemplary stabilizing section in accordance with an embodiment of the present disclosure.
Figure 7:
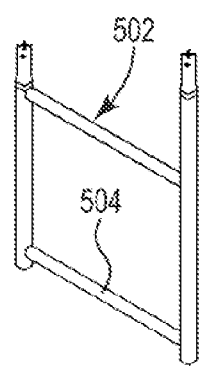
FIG. 7 illustrates an alternative exemplary stabilizing section in accordance with an embodiment of the present disclosure.

FIG. 6 illustrates alternative exemplary ladder stabilizing assembly 402, which is a single component. FIG. 7 illustrates alternative exemplary ladder stabilizing assembly 502, with an extra ladder rung 504 to adjust the height of the ladder 104.

In another embodiment, a ladder stabilizing assembly 112, 402, 502 is located between each ladder section 110 for increased stability.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges which may independently be included in the smaller ranges is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belong. Although any methods and materials similar or equivalent to those described herein can also be used in the practice or testing of the disclosure, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure are not entitled to antedate such publication by virtue of prior invention. Further, the dates of publication provided may be different from the actual publication dates which may need to be independently confirmed.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. A collapsible ladder for supporting an elevated hunting platform, the collapsible ladder comprising:
a plurality of telescopically engaging collapsible ladder segments each comprising a first ladder rail, a second ladder rail, and a plurality of rung members pivotally attached to each of the first and second ladder rails in a parallelogram linkage, such that a separation between the first and second ladder rails is adjustable between a collapsed position to an expanded position; and
at least one rigid ladder segment comprising a stabilizing member including at least one rung member rigidly attached to a pair of rail sections attached to at least one of the collapsible ladder segments, the pair of rail sections on the at least one rigid ladder segment are telescopically attached to, and co-linear with, the first and second ladder rails on the collapsible ladder segment to maintain the first and second ladder rails in the expanded position.

2. The collapsible ladder of claim 1 comprising a plurality of spring lock pins retaining the stabilizing member in telescopic engagement with the first and second ladder rails.

3. The collapsible ladder of claim 1 wherein a collapsible ladder segment telescopically engages with the elevated hunting platform and the elevated hunting platform maintains the first and second ladder rails in the expanded position.

4. The collapsible ladder of claim 1 wherein the first and second ladder rails are one of the same or different lengths.

5. The collapsible ladder of claim 1 wherein adjacent ends of the first and second rails are staggered in the expanded position.

6. The collapsible ladder of claim 1 wherein the rung members are attached adjacent to respective exterior surfaces of the first and second ladder rails.

7. The collapsible ladder of claim 1 wherein the rigid ladder segment includes two rung members.

8. The collapsible ladder of claim 1 wherein the first and second ladder rails are approximately the same length and wherein the rung members are pivotally attached to the first and second ladder rails at different respective points along the lengths thereof so adjacent ends of the first and second rails are staggered.

9. The collapsible ladder of claim 1 wherein the rail sections on the stabilizing member are different lengths.

10. The collapsible ladder of claim 1 comprising a removable rail segment releasably attachable to a rail section of the stabilizing member.

11. An elevated hunting stand comprising:
a platform assembly;
a ladder assembly comprising a first ladder rail, a second ladder rail, and a plurality of rung member pivotally attached to each of the first and second ladder rails in a parallelogram linkage, such that a separation between the first and second ladder rails is adjustable between a collapsed position to an expanded position, the platform assembly attaches to adjacent ends of the first and second ladder rails at a first end of the ladder assembly to maintain the first and second ladder rails in the expanded position; and
a rigid ladder segment comprising a stabilizing member having at least one rung member rigidly attached to a pair of rail sections that are telescopically attached to, and co-linear with, the first and second ladder rails at a second end of the ladder assembly to maintain the first and second ladder rails in the expanded position.

12. The elevated hunting stand of claim 11 comprising a plurality of stabilizing members attached to the ladder assembly to substantially fix a separation between the first and second rails.

13. The elevated hunting stand of claim 11 wherein the ladder assembly includes a plurality of ladder sections.

14. A method of assembling an elevated hunting stand comprising the steps of:
converting a first ladder assembly from a collapsed position to an expanded position by separating first and second ladder rails connected by a plurality of pivotally attached rung members in a parallelogram linkage; and
attaching adjacent ends of the first and second rails to a platform assembly to maintain the first and second ladder rails in the expanded position; and
attaching a rigid ladder segment comprising a stabilizing member having at least one rung member rigidly attached a pair of rail sections, to a second end of the first ladder assembly so the first and second ladder rails are telescopically attached to, and co-linear with, the pair of rail sections to maintain the first and second ladder rails in the expanded position.

15. The method of claim 14 comprising telescopically engaging the first and second ladder rails to the platform assembly.

16. The method of claim 14 comprising the steps of:
converting a second ladder assembly from a collapsed position to an expanded position;
telescopically engaging the second ladder assembly to the first ladder assembly; and
attaching the rigid ladder segment to a second end of the second ladder assembly.

17. The method of claim 14 comprising the steps of attaching rail sections rigidly attached to a rung member of a stabilizing member to the second ladder assembly, to maintain the first and second ladder rails in the expanded position.

* * * * *